United States Patent
Bierlein et al.

(10) Patent No.: US 10,160,162 B2
(45) Date of Patent: Dec. 25, 2018

(54) INDUCTION SEALING DEVICE AND METHOD FOR MANUFACTURING AN INDUCTION SEALING DEVICE

(71) Applicant: TETRA LAVAL HOLDINGS & FINANCE S.A., Pully (CH)

(72) Inventors: Par Bierlein, Dalby (SE); Karl Israelsson, Malmo (SE); Daniel Sandberg, Flyinge (SE); Vincenzo De Salvo, Malmo (SE); Martin Alexandersson, Furulund (SE); Karl-Axel Johansson, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 428 days.

(21) Appl. No.: 14/783,991

(22) PCT Filed: Mar. 28, 2014

(86) PCT No.: PCT/EP2014/056329
§ 371 (c)(1),
(2) Date: Oct. 12, 2015

(87) PCT Pub. No.: WO2014/166765
PCT Pub. Date: Oct. 16, 2014

(65) Prior Publication Data
US 2016/0059480 A1    Mar. 3, 2016

(30) Foreign Application Priority Data

Apr. 10, 2013 (SE) ...................................... 1350448

(51) Int. Cl.
*B29C 65/00* (2006.01)
*B29C 65/36* (2006.01)
(Continued)

(52) U.S. Cl.
CPC .......... *B29C 66/8491* (2013.01); *B29C 65/32* (2013.01); *B29C 65/368* (2013.01);
(Continued)

(58) Field of Classification Search
CPC . B29C 65/32; B29C 65/3656; B29C 65/3668; B29C 65/368; B29C 66/8491;
(Continued)

(56) References Cited

U.S. PATENT DOCUMENTS 3,721,534 A * 3/1973 Kubick .................... B22C 3/00
427/189
4,506,125 A * 3/1985 Smets ..................... C03C 27/06
219/633
(Continued)

FOREIGN PATENT DOCUMENTS

EP    0212490 A2    3/1987
EP    1413520 B1    8/2006
(Continued)

OTHER PUBLICATIONS

International Search Report (PCT/ISA/210) dated Sep. 5, 2014, by the European Patent Office as the International Searching Authority for International Application No. PCT/EP2014/056329.
(Continued)

*Primary Examiner* — Daniel McNally
(74) *Attorney, Agent, or Firm* — Knobbe, Martens, Olson & Bear, LLP

(57) ABSTRACT

The present invention relates to an induction sealing device for heat sealing packaging material for producing sealed packages of pourable food products. The present invention also relates to a method of manufacturing such an induction sealing device. The device comprises at least one inductor coil provided with at least one elongated sealing surface for cooperation with the packaging material during sealing. The
(Continued)

sealing surface comprises a protruding ridge extending along a longitudinal extension of the sealing surface for cooperation with the packaging material and for increasing the sealing pressure on the packaging material during sealing.

20 Claims, 9 Drawing Sheets

(51) Int. Cl.
*B65B 51/22* (2006.01)
*B29C 65/32* (2006.01)
*B29C 65/74* (2006.01)

(52) U.S. Cl.
CPC ...... *B29C 65/3656* (2013.01); *B29C 65/3668* (2013.01); *B29C 66/0062* (2013.01); *B29C 66/1122* (2013.01); *B29C 66/4312* (2013.01); *B29C 66/72321* (2013.01); *B29C 66/8122* (2013.01); *B29C 66/81413* (2013.01); *B29C 66/81422* (2013.01); *B29C 66/81427* (2013.01); *B29C 66/849* (2013.01); *B29C 66/8432* (2013.01); *B65B 51/227* (2013.01); *B29C 65/745* (2013.01); *B29C 66/71* (2013.01); *B29C 66/72328* (2013.01); *B29C 66/72341* (2013.01)

(58) Field of Classification Search
CPC ............. B29C 66/1122; B29C 66/4312; B29C 66/72321; B29C 66/8122; B29C 66/81413; B29C 66/81422; B29C 66/81427; B29C 66/8432; B29C 66/849
See application file for complete search history.

(56) References Cited

U.S. PATENT DOCUMENTS

| 4,704,509 | A | * | 11/1987 | Hilmersson | ............. | B29C 65/18 |
| | | | | | | 219/633 |
| 5,649,407 | A | * | 7/1997 | Blomqvist | .......... | B29C 65/3656 |
| | | | | | | 53/373.7 |
| 5,968,399 | A | | 10/1999 | Selberg | | |
| 2009/0101286 | A1 | * | 4/2009 | Sumeer | ................... | B29C 65/04 |
| | | | | | | 156/380.4 |
| 2011/0030315 | A1 | * | 2/2011 | Mancin | ................... | B29C 65/02 |
| | | | | | | 53/285 |
| 2013/0263556 | A1 | | 10/2013 | Babini et al. | | |

FOREIGN PATENT DOCUMENTS

| EP | 2 468 480 A1 | 6/2012 |
| EP | 2468480 A1 | 6/2012 |
| JP | H10-321361 | 12/1998 |
| JP | H11-514319 | 12/1999 |
| WO | WO 97/14547 | 4/1997 |
| WO | WO 97/14547 A1 | 4/1997 |
| WO | WO 2012/019925 | 2/2012 |
| WO | WO 2012/019925 A1 | 2/2012 |
| WO | 2013045254 A1 | 4/2013 |
| WO | WO 2013/045254 | 4/2013 |

OTHER PUBLICATIONS

Written Opinion (PCT/ISA/237) dated Sep. 5, 2014, by the European Patent Office as the International Searching Authority for International Application No. PCT/EP2014/056329.

Davis, J.R.; "Practical Design Guidelines for Surface Engineering" Chapter 8, Surface Engineering for Corrosion and Near Resistance, ASM International, Mar. 2001; eISBN: 9781615030729, pISBN: 9780871707000; pp. 195-229.

Office Action in European Application No. 14713137 dated Jun. 26, 2018 in 9 pages.

* cited by examiner

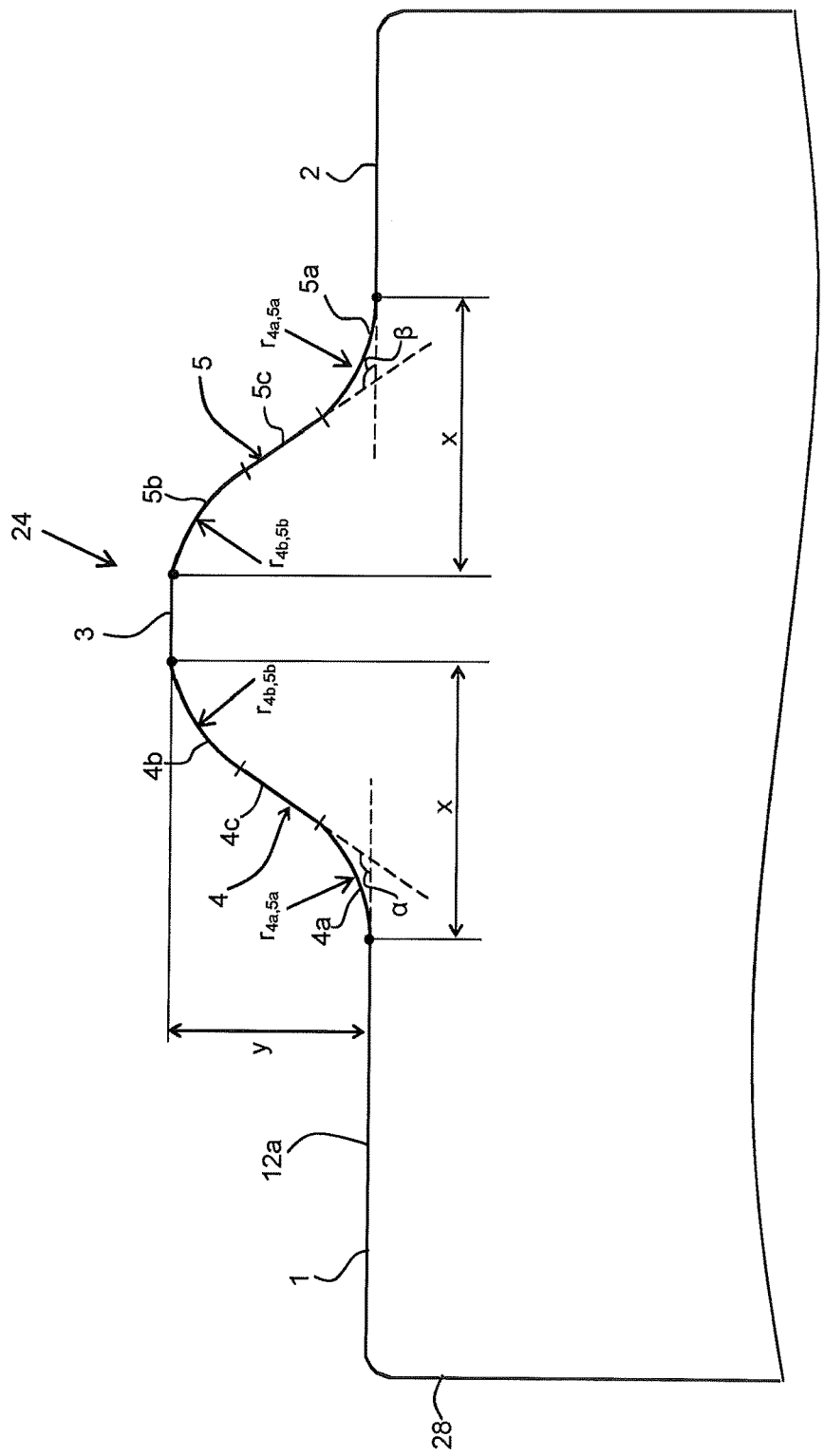

INDUCTION SEALING DEVICE AND METHOD FOR MANUFACTURING AN INDUCTION SEALING DEVICE

TECHNICAL FIELD

The present invention relates to an induction sealing device for heat sealing packaging material for producing sealed packages of pourable food products. The present invention also relates to a method of manufacturing such an induction sealing device.

BACKGROUND OF THE INVENTION

Many pourable food products, such as fruit juice, UHT milk, wine, tomato sauce, etc., are sold in packages made of sterilized packaging material. A typical example of this type of package is the parallelepipedic package known as Tetra Brik Aseptic (registered trademark), which is made by folding and sealing a web of laminated packaging material.

The packaging material has a multilayer structure substantially comprising a base layer of fibrous material, e.g. paper, and a number of layers of heat-sealable polymeric material, e.g. polyethylene films, covering both sides of the base layer. In the case of aseptic packages for long-storage products the packaging material also comprises a layer of gas- and light-barrier material, e.g. aluminium foil or ethyl vinyl alcohol (EVOH) film, which is superimposed on a layer of heat-sealable plastic material, and is in turn covered with another layer of heat-sealable polymeric material forming the inner face of the package eventually contacting the food product.

Typically packages made from such packaging material are produced in fully automatic packaging machines. In these machines the packaging material is sterilized, e.g. by applying a chemical sterilizing agent such as a hydrogen peroxide solution which, once sterilization is completed, is removed from the surfaces of the packaging material, e.g. evaporated by heating. After sterilization the web of packaging material is maintained in a closed, sterile environment, and is folded and sealed longitudinally to form a vertical tube. The tube is fed continuously in a first vertical direction, is filled with the sterilized or sterile-processed food product, and is gripped at equally spaced cross sections by pairs of jaws. More specifically, the pairs of jaws act cyclically and successively on the tube, and heat seal the packaging material of the tube to form a continuous row of cushion-shaped packages connected to one another by respective transverse sealing zones, extending in a second direction which is perpendicular to said first direction.

The cushion-shaped packages are separated by cutting the relative transverse sealing zones, and are then fed to a final folding station where they are folded mechanically into the finished parallelepipedic shape.

In an alternative to the above described technique, the packaging material may be cut into blanks. In this case a blank is firstly erected to form a sleeve which is sealed at a first end. Then the package is sterilized. Afterwards, the sleeve is filled with the pourable product through its open second end, and the second end is sealed, so as to complete the formation of the package.

In both cases, the packaging material in which the layer of barrier material comprises an electrically conductive material, is normally heat sealed by a so-called induction heat-sealing process, in which eddy currents are induced in the aluminium layer, resulting in a localized heating and thus melting the heat-sealable polymeric material locally.

More specifically, in induction heat sealing, the sealing device substantially comprises an inductor powered by a high-frequency current generator. The inductor is a coil made of electrically conductive material and the generated electromagnetic field interacts with the aluminium layer in the packaging material to induce eddy currents in it and heat it to the necessary sealing temperature. The coil is typically made of e.g. a metallic material such as e.g. copper.

In case that packages are formed starting from a tube of packaging material, the sealing device is fitted to a first jaw. The other jaw, known as the anvil, comprises a counter-sealing element fitted with pressure pads made of elastomeric material, and which cooperate with the sealing device to heat seal the tube along a relative transverse sealing zone. More specifically, the sealing device locally melts the two layers of heat-sealable polymeric material gripped between the jaws.

Furthermore, the anvil may be arranged with a cutting element. In particular, the cutting element may slide towards and away from the sealing device of the sealing jaw along a third direction orthogonal to first and second direction such that it cuts the continuous row of packages into individual packages in accordance with the previous description.

In case that packages are formed starting from blanks of packaging material, the sealing device may be fitted to a jaw of a packaging machine.

A known sealing device for use in both cases substantially comprises an inductor coil having two sealing surfaces. The inductor coil is partly encapsulated in a supporting body having at least the sealing surfaces exposed on an outer surface of the supporting body, for cooperation with the packaging material during the formation of packages. The power connections are also exposed outside the supporting body. One or more inserts made of magnetic flux-concentrating material, e.g. a composite material comprising ferrite, is arranged inside the supporting body, close to the inductor coil, for guiding the electromagnetic field.

Each sealing surface also comprises a ridge which is intended to cooperate with the packaging material and increase the pressure thereon, so causing the fusion of the melted plastic material of the packaging material in the sealing area.

Typically, the sealing device, and therefore also the inductor coil, is exposed to high temperatures, high pressures and hydrogen peroxide in the packaging machine. This combination creates an aggressive environment which in certain applications causes rapid corrosion and wear of the inductor coil. Consequently, the sealing devices have to be replaced regularly, each replacement causing a stop in the production of packages.

SUMMARY OF THE INVENTION

In view of the above, one object of the present invention is therefore to prolong the lifetime of the sealing device by providing a sealing device more resistant to wear and corrosion. It has been found that a protective coating can be added onto the sealing surfaces of the coil. However, tests have shown that a sealing device of the prior art type is not well adapted for coating, and that particularly the high sealing pressure in the ridge area causes coatings to crack. It is therefore also one object of the present invention to provide a sealing device which has a shape that renders is possible to better provide and maintain a coating on the sealing surfaces.

Above objects are achieved by an induction sealing device for heat sealing packaging material for producing sealed packages of pourable food products. The sealing device comprises at least one inductor coil provided with at least one elongated sealing surface for cooperation with the packaging material during sealing. Said sealing surface comprises a protruding ridge extending along a longitudinal extension of the sealing surface for cooperation with the packaging material and for increasing the sealing pressure on the packaging material during sealing. The profile of said sealing surface, in a plane directed orthogonal to the longitudinal extension, comprises first and second segments and a third segment positioned at a level different from the first and second segments and forming a top surface of the protruding ridge. Further, the profile comprises a fourth segment connecting the first segment to the third segment, said fourth segment comprising a curved portion connecting to the first segment and a curved portion connecting to the third segment, and a fifth segment connecting the third segment to the second segment, said fifth segment comprising a curved portion connecting to the third segment and a curved portion connecting the fifth segment to the second segment.

In one or more embodiments the first, second and third segments are rectilinear and forming plane sealing surface areas for cooperation with the packaging material during sealing.

In one or more embodiments the fourth and fifth segments are inclined in relation to the first, second and third segments.

In addition, in one or more embodiments the fourth and fifth segments are each provided with a straight portion in between the curved portions.

In one or more embodiments the straight portions of the fourth and fifth segments each connects tangentially to the curved portions.

In one or more embodiments the straight portions are inclined in relation to the first, second and third segments.

Further, in one or more embodiments the curved portions of the fourth segment tangentially connect to the first and third segments, and the curved portions of the fifth segment tangentially connect to the third and second segments.

Furthermore, in one or more embodiments the curved portion of the fourth segment connecting to the first segment is concave, the curved portion of the fifth segment connecting to the second segment is concave and the curved portions of the fourth and fifth segments connecting to the third segment are convex.

In one or more embodiments the third segment is curved.

In one or more embodiments the curved portions of the fourth segment meet each other and form an S-shape, and the curved portions of the fifth segment meet each other and form a reversed S-shape.

In one or more embodiments the straight portions of the fourth and fifth segments are orthogonal to the first and second segments.

In one or more embodiments the preceding claims, wherein the coil, on its surfaces, is provided with a coating.

In one or more embodiments all the surfaces of the coil, or all the surfaces of the coil except for surfaces of power connections, are provided with said coating.

In one or more embodiments the coating is multi-layered and comprises an inner layer protecting the surfaces of the coil against corrosion and an outer layer protecting the coil and the inner layer against wear.

Further, in one or more embodiments the coil is made of a metal material, the inner layer of the coating is made of nickel (Ni) and the outer layer of the coating is made of chromium (Cr).

Above objects are also achieved by a method of manufacturing an induction sealing device for heat sealing packaging material for producing sealed packages of pourable food products. The induction sealing device comprises at least one inductor coil provided with at least one elongated sealing surface for cooperation with the packaging material during sealing. The sealing surface comprises a protruding ridge extending along the longitudinal extension of the sealing surface for cooperation with the packaging material and for increasing the sealing pressure on the packaging material during sealing. The method comprises the step of providing the sealing surface with a profile, in a plane directed orthogonal to the longitudinal extension, which profile comprises first and second segments, a third segment positioned at a level different from the first and second segments and forming a top surface of the protruding ridge, a fourth segment connecting the first segment to the third segment, said fourth segment comprising a curved portion connecting to the first segment and a curved portion connecting to the third segment, and a fifth segment connecting the third segment to the second segment, said fifth segment comprising a curved portion connecting to the third segment and a curved portion connecting the fifth segment to the second segment.

In one or more embodiments the method comprises the step of providing a coating to onto the surfaces of the coil.

In one or more embodiments all the surfaces of the coil or all the surfaces of the coil except for surfaces of power connections are provided with the coating.

In one or more embodiments the method comprises the step of providing a multi-layered coating that comprises an inner layer protecting the surfaces of the coil against corrosion and an outer layer protecting the coil and the inner layer against wear.

In one or more embodiments the method comprises the steps of manufacturing the coil of a metal material, forming the inner layer by plating the coil with nickel (Ni), and thereafter forming the outer layer by plating chromium (Cr) on top of the inner layer.

According to another aspect and as mentioned above, one object of the present invention may be to provide a sealing device more resistant to wear and corrosion. The object is achieved by an induction sealing device for heat sealing packaging material for producing sealed packages of pourable food products, comprising at least one inductor coil provided with at least one elongated sealing surface for cooperation with the packaging material during sealing, wherein at least said sealing surface has a coating.

In one or more embodiments the coating is multi-layered and comprises an inner layer protecting the sealing surface against corrosion and an outer layer protecting the sealing surface and the inner layer against wear.

In one or more embodiments the coil is made of a metal material, the inner layer of the coating being made of nickel (Ni) and the outer layer of the coating being made of chromium (Cr).

In one or more embodiments all the surfaces of the coil or all the surfaces of the coil except for surfaces of power connections are provided with the coating.

The object is further achieved by a method of manufacturing an induction sealing device for heat sealing packaging material for producing sealed packages of pourable food products, comprising at least one inductor coil provided with at least one elongated sealing surface for cooperation with the packaging material during sealing, wherein said method comprises the step of providing a coating onto at least the sealing surface.

In one or more embodiments the step of providing a coating comprises the step of providing a first layer protecting the sealing surface against corrosion and the step of providing a second layer onto said first layer, said second layer protecting the sealing surface and the first layer against wear.

In one or more embodiments the first layer is made of nickel (Ni) and the second layer is made of chromium (Cr).

In one or more embodiments the method comprises the step of providing the coating to at least all the surfaces of the coil or all the surfaces of the coil except for surfaces of the power connections.

BRIEF DESCRIPTION OF DRAWINGS

The above, as well as additional objectives, features and advantages of the present invention, will be better understood through the following illustrative and non-limiting detailed description of embodiments of the present invention, reference being made to the appended schematic drawings.

FIG. 6 is view more detailed than FIG. 4, and shows only a first sealing surface of the coil without the coating.

DETAILED DESCRIPTION OF EMBODIMENTS

Figure 1:
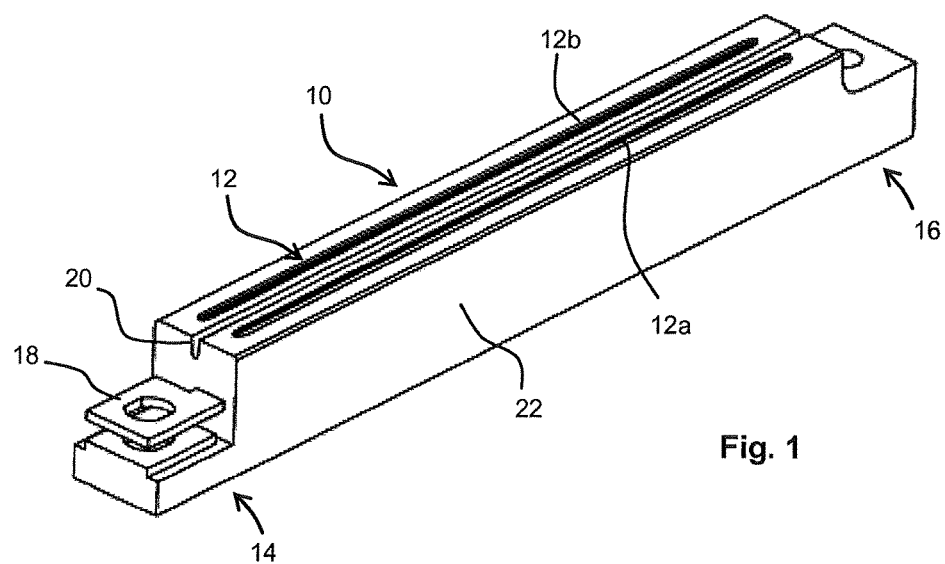
FIG. 1 is a perspective view of an induction sealing device according to the invention.

FIG. 1 shows an induction sealing device 10. It comprises an inductor coil 12 extending rectilinearly from a first end 14 of the sealing device 10 to an opposite end 16. It has a longitudinal extension between the first and the second ends 14, 16. Electrical connectors (not shown) are adapted to be connected to power connections 18 of the coil 12 for allowing electrical current to flow through the coil 12, which electrical current is supplied by an external power supply (not shown). Cooling means (not shown) may also be provided within the sealing device 10.

Figure 2:
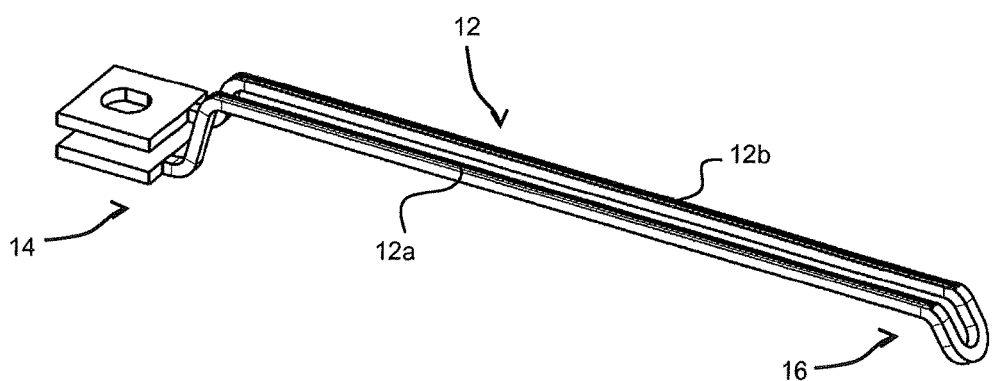
FIG. 2 is a perspective view of a coil of the induction sealing device of FIG. 1.

The coil, also seen in FIG. 2, is provided with two sealing surfaces 12a, 12b. The surfaces are provided in parallel and spaced apart. The coil 12 extends from the first end 14 to the opposite end 16 along a rectilinear path thus forming the first sealing surface 12a, where it changes direction and returns back to the first end 14, thus forming the second sealing surface 12b parallel to the first. By having such arrangement of the coil 12, a single sealing device may provide two adjacent seals simultaneously. Alternatively, the coil may be of the single seal type having only one sealing surface.

As seen in FIG. 1 the inductor coil 12 is partly encapsulated in a supporting body 22. The sealing surfaces 12a, 12b are exposed on an outer surface of the supporting body 22 for cooperation with the packaging material during the formation of packages. The supporting body 22 is typically made of a polymeric material, preferably glass-fiber reinforced polymeric material. The power connections 18 of the coil 12 are also exposed outside the supporting body 22. Optionally, one or more inserts (not shown) made of magnetic flux-concentrating material, e.g. a composite material comprising ferrite, are arranged inside the supporting body 22, close to the inductor coil 12. A groove 20 is provided between the sealing surfaces 12a, 12b of the coil 12 for allowing a cutting tool to run in the groove 20 whereby a package may be separated from the tube in an efficient manner.

Figure 3:
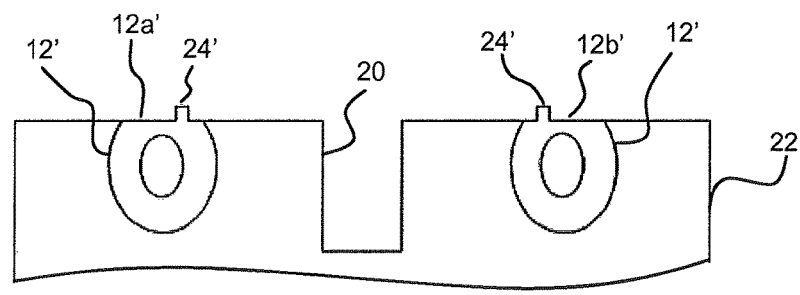
FIG. 3 is a cross sectional view of a portion of a prior art sealing surface profile in a plane directed orthogonal to a longitudinal extension of the sealing surface.

FIG. 3 shows a cross sectional view of a portion of a prior art coil 12' in an induction sealing device 10 of the type described with regard to FIGS. 1 and 2. The cross sectional view is in a plane directed orthogonal to a longitudinal extension of the sealing device, which is readily understood from comparing with e.g. FIG. 1. The longitudinal extension being the extension between the first end 14 and the second end 16. From FIG. 3 it is shown that each sealing surface 12a', 12b' of the coil 12' comprises a ridge 24'. The ridge 24' is intended to cooperate with the packaging material and increase the pressure thereon, so causing fusion of the melted plastic material of the packaging material in the sealing area. As can be seen the cross section of the ridge 24' is substantially rectangular. It has been found that it is impossible to successfully provide and maintain a coating on a sealing surface having such ridge 24'.

Figure 4A:
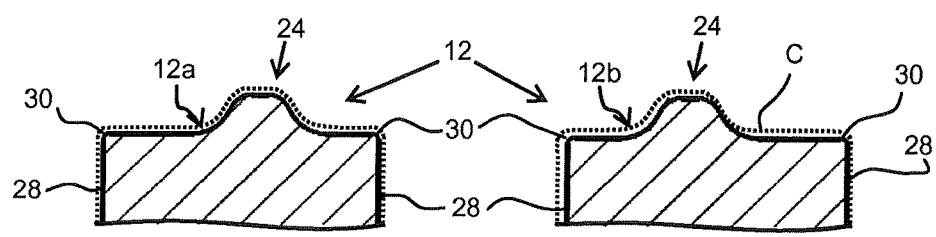
FIG. 4 is a cross sectional view of a portion of a sealing surface profile of a first embodiment of the invention, seen in a plane directed orthogonal to a longitudinal extension of the sealing surface.
Figure 4B:
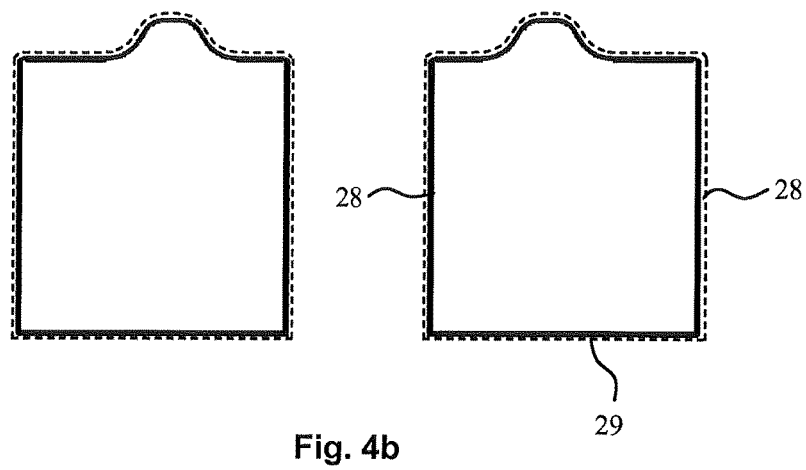
Figure 4C:
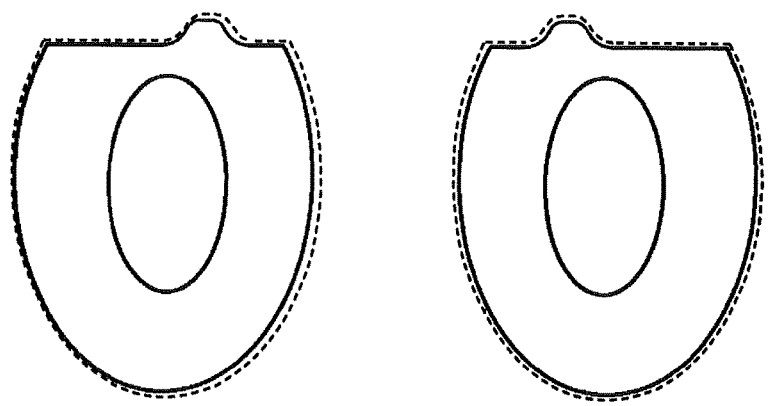

FIG. 4 shows a cross sectional view of a portion of the coil 12 according to a first embodiment of the present invention. The cross sectional view is in a plane directed orthogonal to a longitudinal extension of the sealing device. Only the coil 12 is shown here, but it is to be understood that it may be provided in an induction sealing device 10 of the type described with regard to FIG. 1, and that it may be shaped as shown in FIG. 2. As mentioned above the coil 12 is provided with two elongated sealing surfaces 12a, 12b for cooperation with the packaging material during sealing. Further, each sealing surface 12a, 12b comprises a protruding ridge 24 extending along the longitudinal extension of the sealing surface for cooperation with the packaging material and for increasing the sealing pressure on the packaging material during sealing. Each ridge 24 is positioned slightly offset the center of the respective sealing surface 12a, 12b seen in the horizontal direction. For both ridges 24 the offset is made a distance in the direction towards the groove 20 (only visible in FIG. 1). In this way the seal area will be larger in a direction towards the inner of the package, which seal area acts as an aseptically tight joint, than towards the cut end, in which end the seal area only has to act as a mechanical joint.

Figure 5:
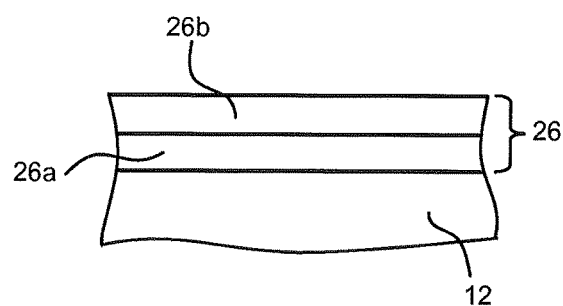
FIG. 5 is a detailed cross section of the coating and a portion of the coil.

The surfaces of the coil 12 are provided with a coating. The dotted lines C in FIG. 4 show part of the area over which the coating is provided, and FIG. 5 shows a cross section through the coating, denoted 26, and through a small portion of the coil 12. Preferably, all surfaces of the coil 12 are provided with the coating 26. An exception may optionally be made for the surfaces of the power connections 18. The purpose of fully coating the coil 12 is to make it robust and able to withstand also aggressive material, such as hydrogen peroxide, that potentially finds its way down into small cracks, channels or delaminations arising between the coil 12 and the supporting body 22. Hence, coating the coil 12 in substantially in its entirety has as its purpose to prevent the sealing device from start corroding from inside.

To facilitate coating around the longitudinally extending edge 30 between the sealing surface 12a, 12b and the side surface 28 the edge 30 is preferably rounded, i.e. there is provided a curved surface segment between the sealing surface 12a, 12b and its side surfaces 28.

The coating 26 is multi-layered, each layer having different protection focus, i.e. one acts as corrosion protection, another acts as wear protection. In this embodiment the coating 26 comprises a first, inner layer 26a protecting the coil 12 against corrosion and a second, outer layer 26b protecting the coil 12 and the inner layer 26a against wear. The inner layer 26a is naturally applied first, whereby the outer layer 26b is applied on top of the inner layer 26a. In this embodiment the coil 12 is made of copper (Cu), but alternatively it can be made of another metal material such as aluminium (Al), silver (Ag), gold (Au), steel, preferably stainless steel, or alloys comprising one or several of said metals, potentially comprising nickel (Ni) as well.

The inner layer 26a of the coating 26 is made of nickel (Ni) being a material with high resistance to corrosion. The nickel is plated onto the copper coil 12 to give corrosion/oxidization protection. The thickness of the layer is preferably chosen within the interval from substantially 0 up to about 100 micrometers. The second, outer layer 26b of the coating is made of chromium (Cr) being a hard and brittle material particularly chosen for its resistance to wear. The material also has some corrosion resistance. The thickness of the layer is preferably chosen within the interval from substantially 0 up to about 100 micrometers. The total thickness of the multilayered coating 26 is within the interval from substantially 0 up to about 200 micrometers, e.g. within the interval 50-150 micrometers, e.g. around 100 micrometers. Alternative coating materials are for example silver (Ag), tantalum (Ta), hard gold (Au), DLC (Diamond-Like Carbon) and CRC (Chromium Carbide). Silver has good corrosion resistance, whereas DLC and CRC have good wear resistance. Tantalum and hard gold both have good corrosion and wear resistance, and can hence be used for both layers 26a, 26b. In such case it is optional whether to apply one single thicker layer, or two less thick layers on top of each other.

In order to be able to provide the above mentioned coating 26 to the sealing surface 12a, 12b and to make it last there to a much higher extent, it has been found that the sealing surface 12a, 12b ought not to comprise any sharp edges or vertical surfaces. At sharp edges, corners and vertical surfaces the coating will rapidly crack during exposure to the high sealing pressures.

FIG. 6 shows a sealing surface profile of the coil 12 which profile is suitable for the application of a coating 26 of the above mentioned type. The figure offers a more detailed view than FIG. 4, and shows only the first sealing surface 12a of the coil 12 without the coating 26. The view shows a profile of the sealing surface in a plane directed orthogonal to the longitudinal extension of the sealing device 10. The profile comprises a first segment 1 and a second segment 2 forming base sealing surface areas. The first and second segments 1, 2 are straight and forming plane sealing surface areas for cooperation with the packaging material during sealing. The profile further comprises a third segment 3 positioned at a level different from the first and second segments 1, 2. The third segment 3 forms a top surface of the protruding ridge 24. Further, the profile comprises a fourth segment 4 connecting the first segment to the third segment 3 and a fifth segment 5 connecting the third segment 3 to the second segment 2. The third segment 3 is positioned at a level offset from the base formed by the first and second segments 1, 2 seen in the vertical direction in the figure. It is also seen in the figure that the first and second segments 1, 2 are displaced a distance from the endpoints of the third segment 3 seen in the horizontal direction in the figure, i.e. the third segment 3 is positioned a distance offset the nearest endpoint of the first segment 1. Similarly, the second segment 2 is positioned a distance offset the other endpoint of the third segment 3. Hence, a distance x is formed between the first and third segments 1, 3 and between the third and second segments 3, 2. The fourth and fifth segments 4, 5 provide connectors and extend both a distance in the horizontal direction, i.e. distance x, and in the vertical direction, see distance y in the figure, to connect the first and third segments 1, 3 and the third and second segments 3, 2 respectively. This makes the fourth and fifth segments 4, 5 inclined in relation to the first, second and third segments 1, 2, 3. For visibility the divisions between the segments are marked by dots.

The fourth segment 4 comprises a curved portion 4a connecting to the first segment 1 and a curved portion 4b connecting to the third segment 3. The fifth segment 5 comprises a curved portion 5a connecting to the second segment 2 and a curved portion 5b connecting to the third segment 3. The fourth and fifth segments 4, 5 are each provided with a straight portion 4c, 5c respectively in between the curved portions. In this embodiment the straight portion 4c, 5c is substantially as long as the two curved portions 4a, 4b, 5a, 5b respectively, i.e. the three portions of each segment are substantially equally long. It will be apparent from the other embodiments that the length proportions do not need to be substantially equal. The straight portion 4c of the fourth segment 4 is inclined in relation to the first segment 1. Similarly, the straight portion 5c of the fifth segment 5 is inclined in relation to the second segment 2. The inclination angles are denoted α and β in the figure. For visibility the divisions between the curved and straight portions of the fourth and fifth segments 4, 5 are marked with small lines substantially orthogonal to the lines forming the segments.

In order to make smooth connections between the curved and straight portions of the fourth and fifth segments 4, 5, the straight portions 4c, 5c each connects tangentially to their respective curved portions 4a, 4b, 5a, 5b. Further, the curved portions of the fourth segment 4 tangentially connect to the first and third segments 1, 3, and the curved portions of the fifth segment 5 tangentially connect to the third and second segments 3, 2.

As can be seen in the figure the shape of the coil 12 in the curved portion 4a of the fourth segment 4 connecting to the first segment 1 is concave and the other curved portion 4b of the fourth segment 4 connecting to the third segment 3 is convex. Similarly, the curved portion 5a of the fifth segment 5 connecting to the second segment 2 is concave and the curved portion 5b of the fifth segment 5 connecting to the third segment 3 is convex. Each curved portion is formed as e.g. a circular or elliptic arc or a parabolic curve. It may also be formed by two or more circular arcs and/or elliptic arcs and/or parabolic curves. The first embodiment shows curved portions formed as circular arcs, where the radius of the of the curved portions 4a, 5a connecting to the first and second segments are denoted $r_{4a,5a}$ and the radius of the curved portions 4b, 5b connecting to the third segment is denoted $r_{4b,5b}$. In the first embodiment the radii are the same, i.e. the radius $r_{4a,5a}$ is similar to the radius $r_{4b,5b}$.

The fourth and fifth segments 4, 5 have been described as being similar, although reversed, in the first embodiment. However, it should be understood that they may be shaped different from each other with different curvatures of the curved portions, different inclination angels α, β and different lengths of the straight portions.

In the following further embodiments will be described. For ease of understanding the same reference numerals will be used for the same features. Only the differences between the embodiments will be described.

Figure 7:
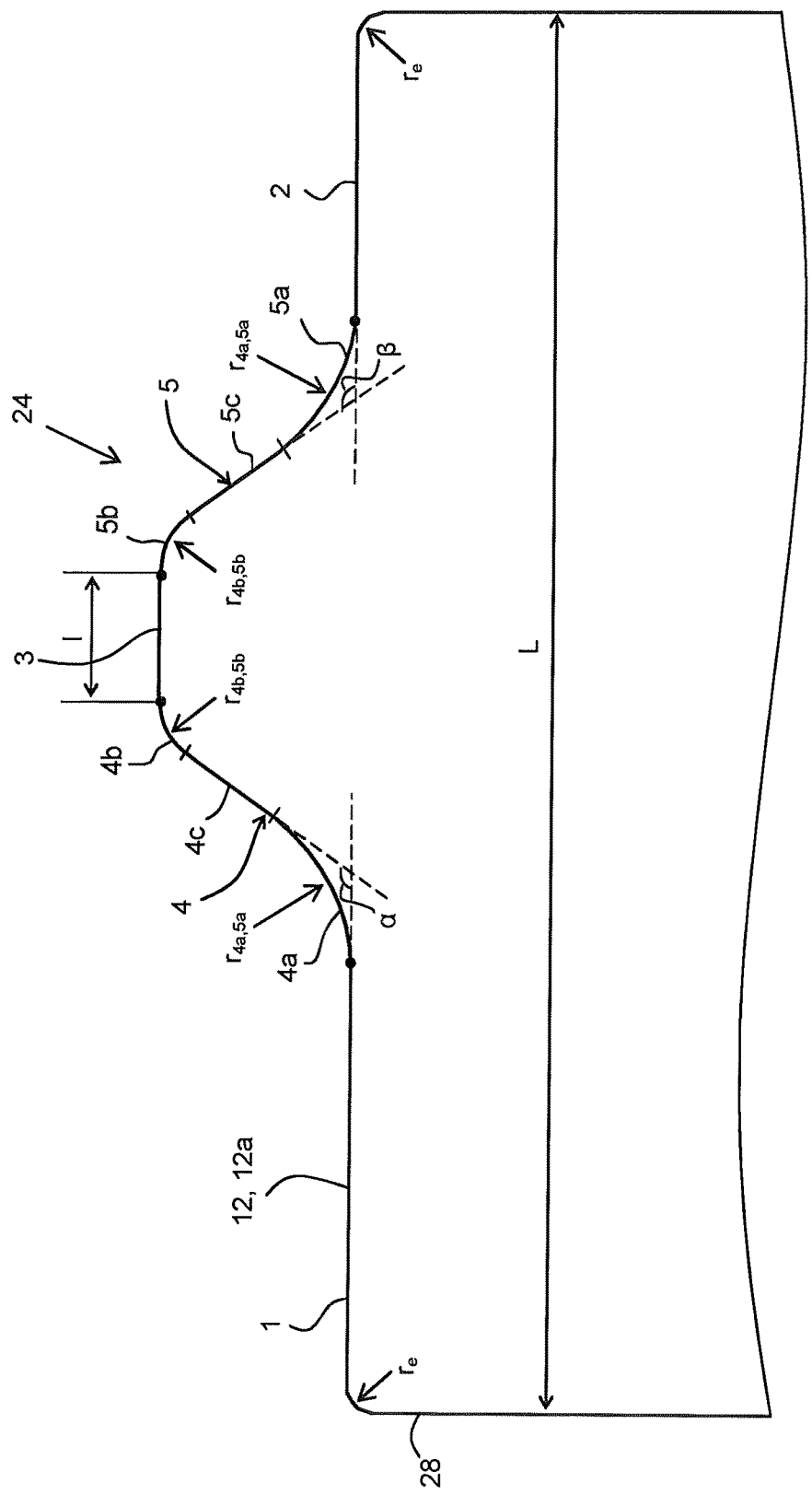
FIG. 7 is a view similar to FIG. 6 but of a second embodiment of the present invention.

FIG. 7 shows a view similar to FIG. 6 but of a second embodiment having a sealing surface profile being slightly different from that of the first embodiment.

In the second embodiment the curved portions 4b, 5b connecting to the third segment 3 are circular arcs having a radius $r_{4a,5a}$ smaller than the radius $r_{4b,5b}$ of the circular arcs forming the curved portions 4a, 5a connecting to the first and second segments 1, 2 respectively. The ratio $r_{4b,5b}/r_{4a,5a}$ is preferably in the interval 1.0-2.0, for example the ratio is 1.7. Further, the third segment has a length l and the sealing surface 12a has a length L from one side surface 28 to the other side surface 28. The ratio L/l is preferably in the interval 4-8, for example the ratio is about 6. Further, the ratio l/y, y being the height of the ridge 24 measured from the base sealing area formed by the first and second segments 1, 2, is in the interval 0.5-2.0, preferably 1.

As mentioned above the edge 30 will be rounded having a radius $r_e$. The ratio $r_{4b,5b}/r_e$ is about 3,5.

The inclination angles α, β may be the same for the fourth and fifth segments 4, 5, but may also be different. The angles range between about 91° and about 179°, preferably between 100°-140°.

An exemplary sealing device of the second embodiment may have the following dimensions: L=2.1 mm, l=0.325 mm, $r_{4a,5a}$=0.3 mm, $r_{4b,5b}$=0.175 mm, $r_e$=0.05 mm, α, β=120°, y=0.3 mm. The length of the sealing surface along the longitudinal extension is about 120 mm and the distance between the sealing surfaces 12a, 12b, in a direction orthogonal to the longitudinal extension, is about 4.4 mm.

Figure 8:
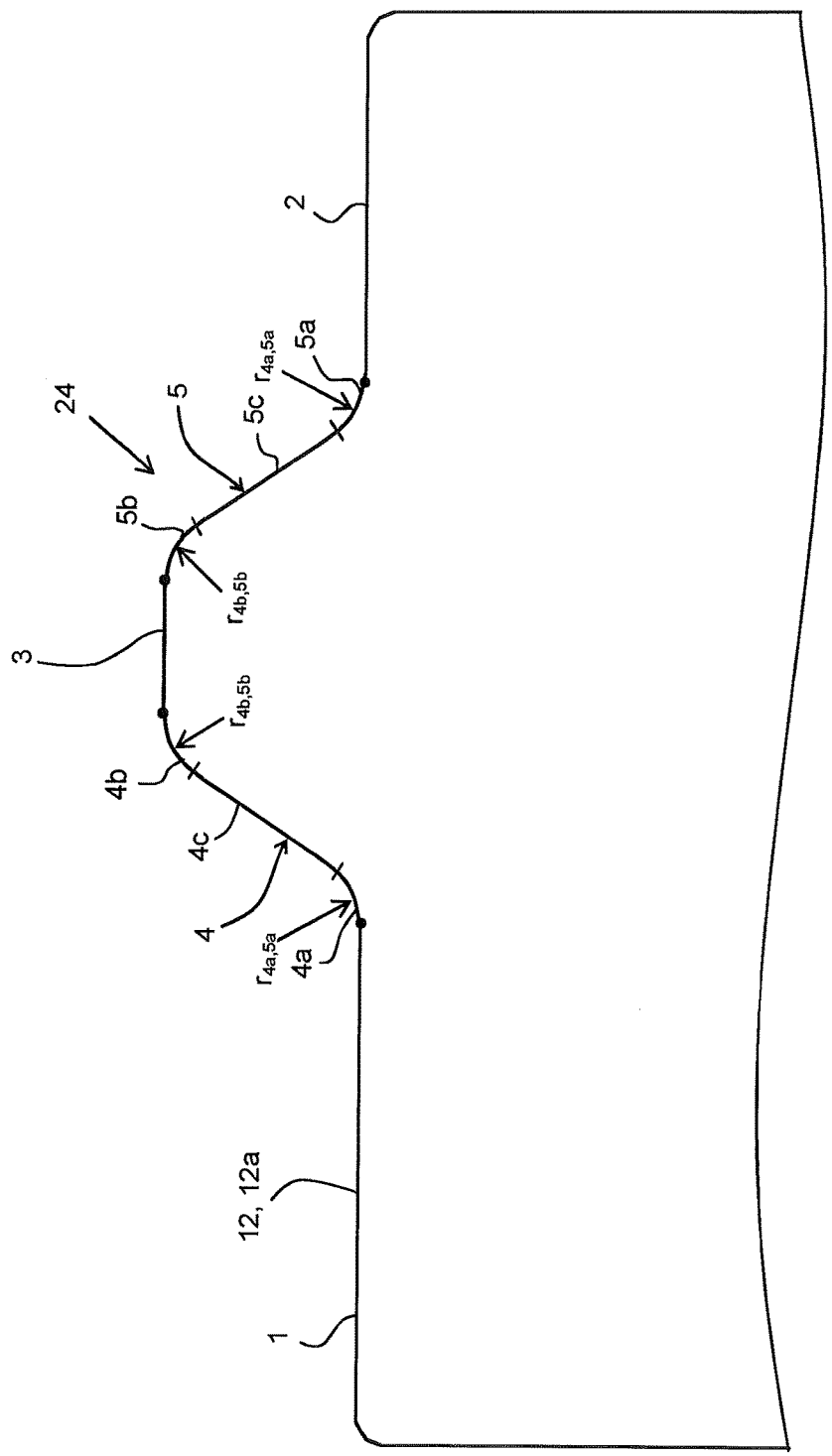
FIG. 8 is a view of a third embodiment of the present invention.

FIG. 8 shows a view similar to FIG. 6 and FIG. 7 but of a third embodiment having a sealing surface profile being slightly different from that of the previously described embodiments.

In the third embodiment the curved portions 4a, 4b, 5a, 5b of the fourth and fifth segments 4, 5 are relatively small compared to the straight portions 4c, 5c. The length of the straight portion is about 3-5 times longer than the length of each curved portion.

Figure 9:
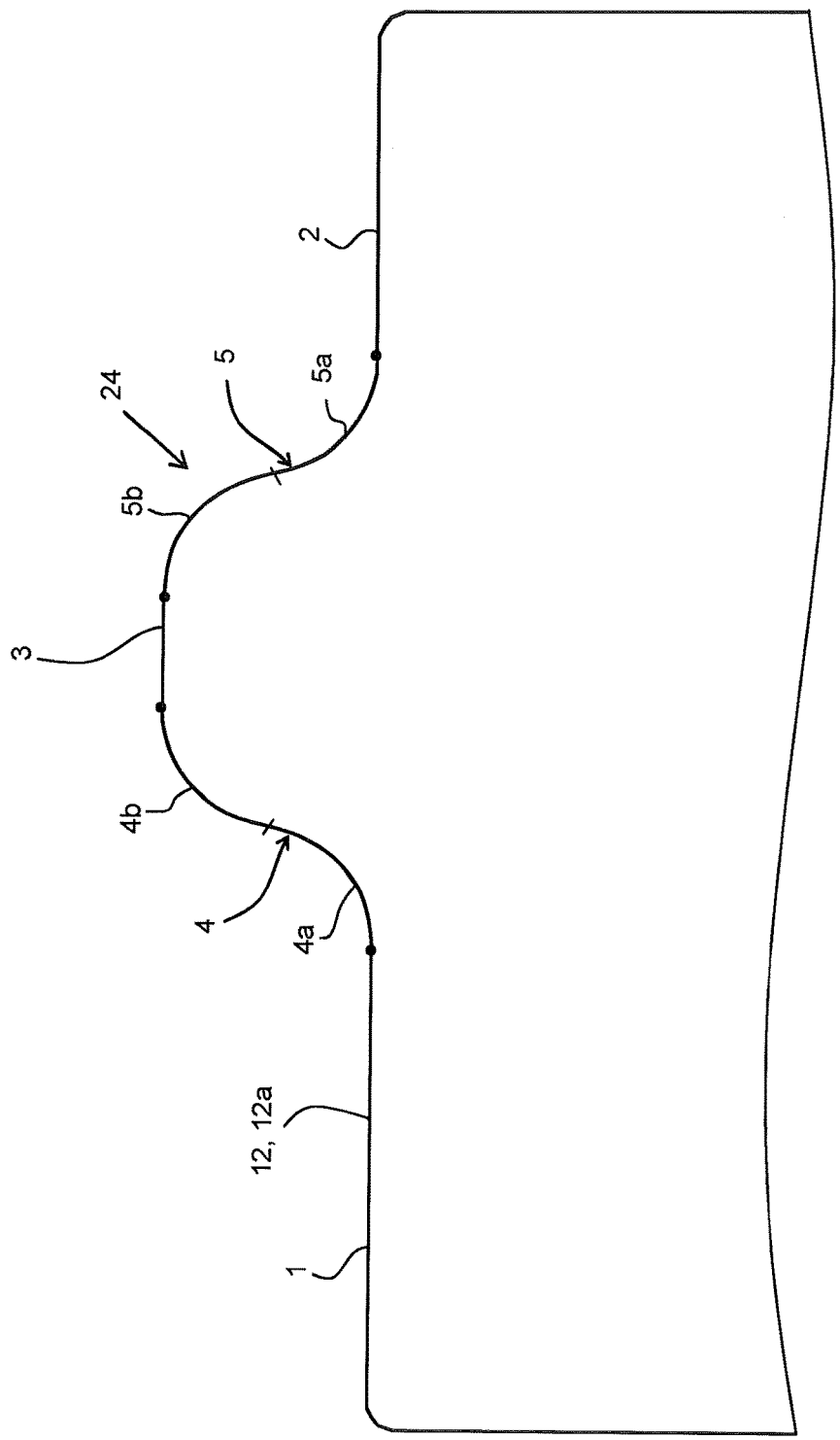
FIG. 9 is a view of a fourth embodiment of the present invention.

FIG. 9 shows a fourth embodiment. The curved portions 4a, 4b of the fourth segment 4 meet each other and form an S-shape, and the curved portions 5a, 5b of the fifth segment 5 meet each other and form a reversed S-shape. There are no or only very small straight portions in between the curved portions.

Figure 10:
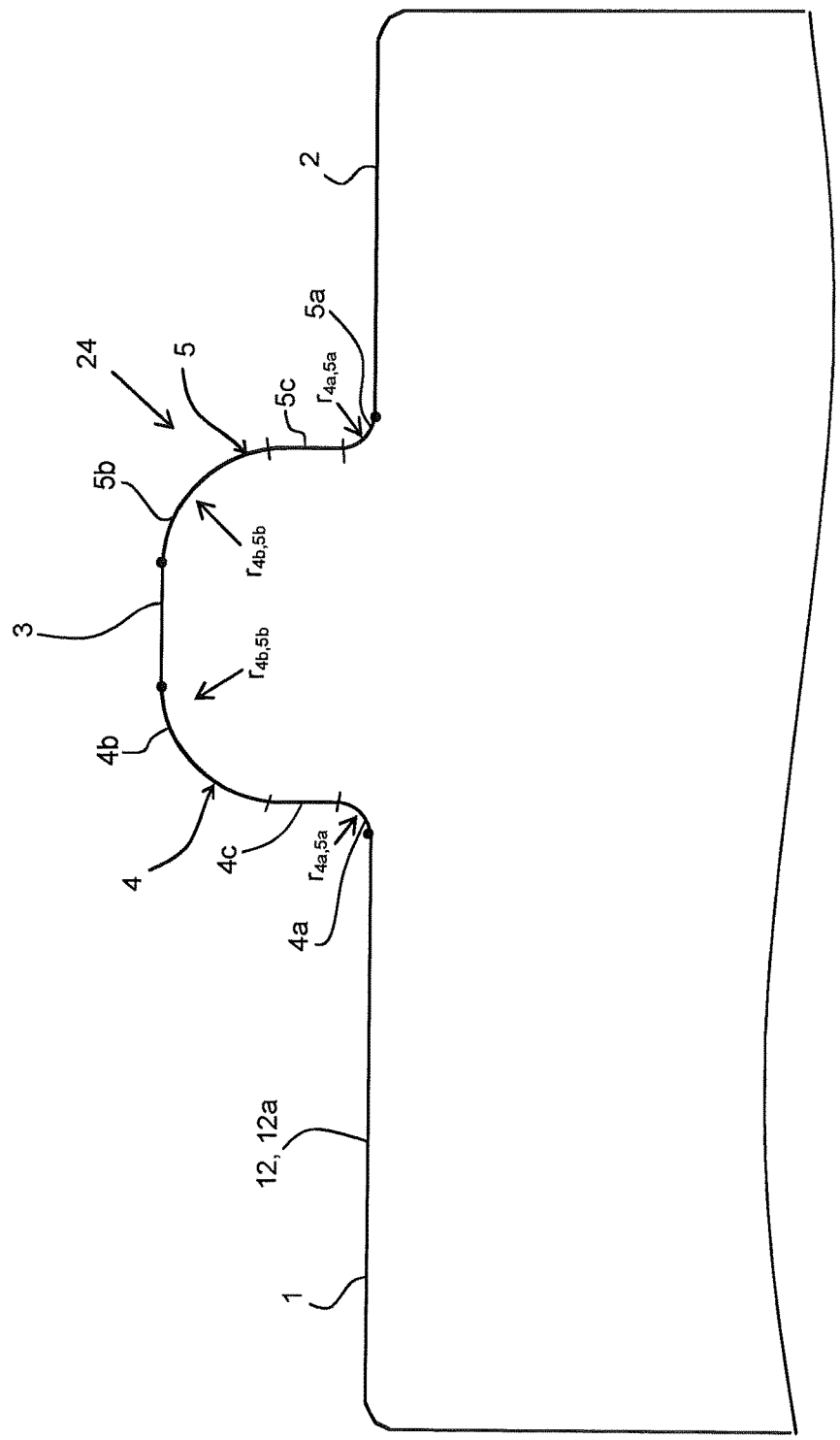
FIG. 10 is a view of a fifth embodiment of the present invention.

FIG. 10 shows a fifth embodiment. In this embodiment the straight portions 4c, 5c of the fourth and fifth segments 4, 5 are orthogonal to the first, second and third segments 1, 2, 3. The ratio $r_{4b,5b}/r_{4a,5a}$ is preferably in the interval 1,0-6,0.

Figure 11:
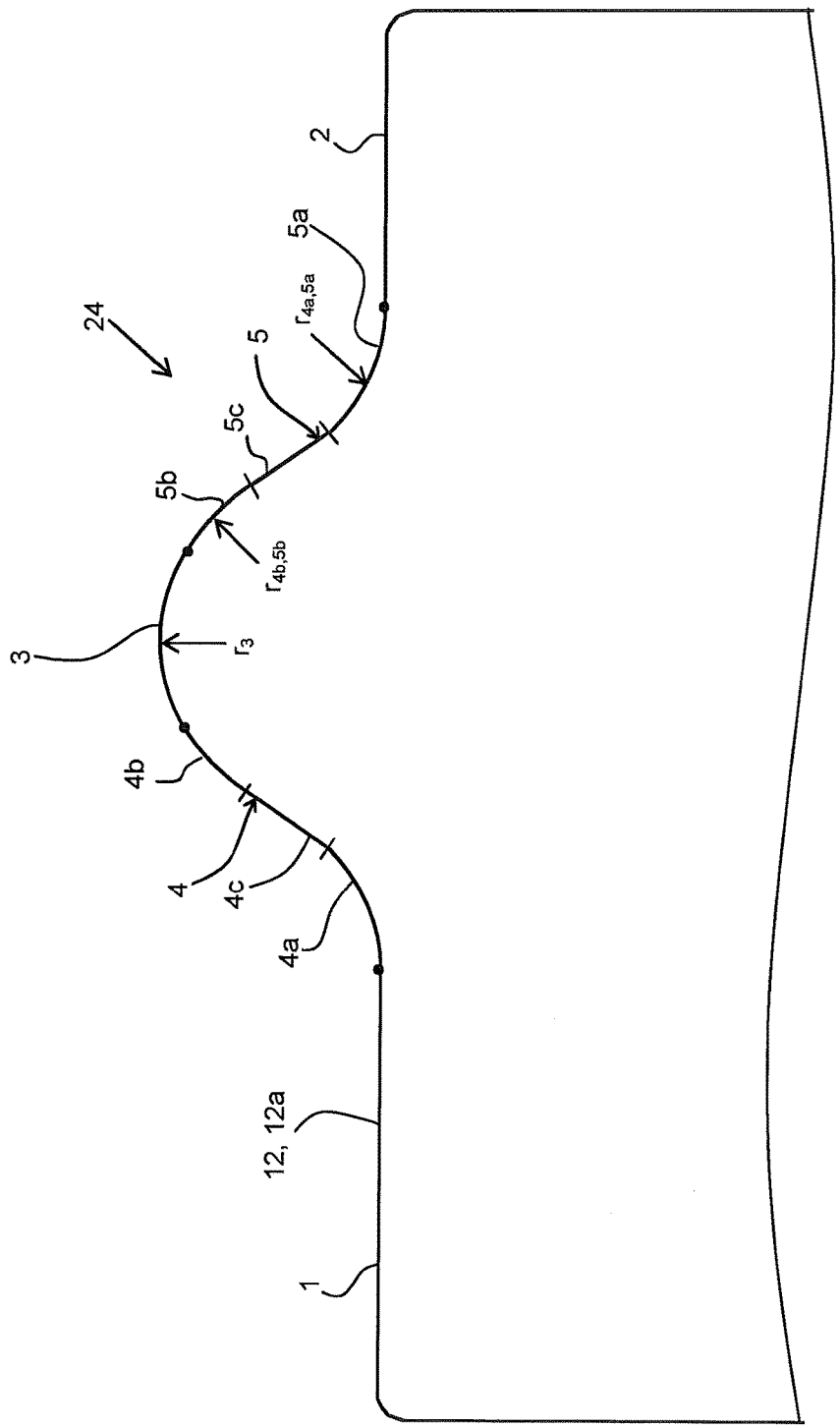
FIG. 11 is a view of a sixth embodiment of the present invention.

FIG. 11 shows a sixth embodiment being different from the previously described in that the third segment 3 is curved instead of straight. Hence, in this embodiment the curved portion 4b, the curved portion 5b and the third segment 3 together form an upper, rounded portion of the ridge 24. The curvature of the third segment 3 tangentially meets the curvature of the curved portions 4b, 5b of the fourth and fifth segments 4, 5. The third segment 3 is formed as e.g. a circular or elliptic arc or a parabolic curve. It may also be formed by two or more circular arcs and/or elliptic arcs and/or parabolic curves. In one embodiment the curved portion 4b of the fourth segment 4, the curved portion 5b of the fifth segment 5 and the third segment 3 may be made of arcs having the same radii such that they together form a circular segment. In this embodiment the third segment is formed by an arc having a radii $r_3$. The third segment is convex.

It is apparent to a person skilled in the art that the described embodiments are examples and that various modifications are possible. The invention and its embodiments are thus not limited to the examples described above; instead they may vary within the scope of the claims.

For example, the sealing surfaces 12a and 12b have been described in relation to a conventional coil 12 of a conventional induction sealing device 10. It should be understood that the inventive sealing surface may be applied onto other types of coils of other types of induction sealing devices.

Further, the coating 26 has been described in relation to an exemplary induction sealing device. The coating 26 may in itself be applied to other types of coils of other types of induction sealing devices.

The invention claimed is:

1. An induction sealing device for heat sealing packaging material for producing sealed packages of pourable food products, comprising:
    at least one inductor coil provided with at least one elongated sealing surface configured to contact the packaging material during sealing, said elongated sealing surface comprising a protruding ridge extending along a longitudinal extension of the elongated sealing surface configured to contact the packaging material and increase a sealing pressure on the packaging material during sealing, wherein a profile of said elongated sealing surface in a plane directed orthogonal to the longitudinal extension comprises:
    a first segment abutting a first elongated side surface and a second segment abutting a second elongated side surface;
    a third segment positioned at a level different from the first and second segments and forming a top surface of the protruding ridge;
    a fourth segment connecting the first segment to the third segment, said fourth segment comprising a first curved portion connecting to the first segment, the first curved portion connected to a first straight portion, the first straight portion connected to a second curved portion, the second curved portion connected to the third segment, wherein a first ratio between a radius of the first curved portion and a radius of the second curved portion is between 1.0 and 2.0; and
    a fifth segment connecting the third segment to the second segment, said fifth segment comprising a third curved portion connecting to the third segment, the third curved portion connected to a second straight portion, the second straight portion connected to a fourth curved portion, the fourth curved portion connected to the second segment, wherein a second ratio between a radius of the fourth curved portion and a radius of the third curved portion is between 1.0 and 2.0;

wherein the at least one inductor coil is covered with a coating, the coating configured to prevent corrosion and wear of the at least one inductor coil.

2. The induction sealing device according to claim 1, wherein the first, second, and third segments are rectilinear and form plane sealing surface areas configured to contact the packaging material during sealing.

3. The induction sealing device according to claim 1, wherein the first straight portion of the fourth segment connects tangentially to the first and second curved portions and the second straight portion of the fifth segment connects tangentially to the third and fourth curved portions.

4. The induction sealing device according to claim 1, wherein the first and second straight portions are inclined in relation to the first, second, and third segments.

5. The induction sealing device according to claim 1, wherein the first and second curved portions of the fourth segment tangentially connect to the first and third segments, and the third and fourth curved portions of the fifth segment tangentially connect to the third and second segments.

6. The induction sealing device according to claim 1, wherein the first curved portion of the fourth segment connecting to the first segment is concave, the fourth curved portion of the fifth segment connecting to the second segment is concave, and the second and third curved portions of the fourth and fifth segments connecting to the third segment are convex.

7. The induction sealing device according to claim 1, wherein the third segment is curved.

8. The induction sealing device according to claim 1, wherein the first curved portion, first straight portion, and second curved portion, of the fourth segment form an S-shape, and the third curved portion, second straight portion, and fourth curved portion of the fifth segment form a reversed S-shape.

9. The induction sealing device according to claim 1, wherein the first and second straight portions of the fourth and fifth segments are orthogonal to the first and second segments.

10. The induction sealing device according to claim 1, wherein all the surfaces of the at least one inductor coil, or all the surfaces of the at least one inductor coil except for surfaces of power connections, are provided with said coating.

11. The induction sealing device of claim 1, wherein the coating comprises an inner layer consisting of nickel and an outer layer consisting of chromium.

12. The induction sealing device of claim 1, wherein the first ratio of the fourth segment is not equal to the second ratio of the fifth segment.

13. The induction sealing device of claim 1, wherein the fourth segment further comprises a first inclination angle between the first segment and the first straight portion and the fifth segment further comprises a second inclination angle between the second segment and the second straight portion, and wherein the first and second inclination angles are between 100 and 140 degrees.

14. A method of manufacturing an induction sealing device for heat sealing packaging material for producing sealed packages of pourable food products, said induction sealing device comprising at least one inductor coil provided with at least one elongated sealing surface configured to contact the packaging material during sealing, said elongated sealing surface comprising a protruding ridge extending along the longitudinal extension of the elongated sealing surface configured to contact the packaging material and increase a sealing pressure on the packaging material during sealing, wherein the method comprises the step of providing the elongated sealing surface with a profile in a plane directed orthogonal to the longitudinal extension, wherein the profile comprises:
  a first segment abutting a first elongated side surface and a second segment abutting a second elongated side surface;
  a third segment positioned at a level different from the first and second segments and forming a top surface of the protruding ridge;
  a fourth segment connecting the first segment to the third segment, said fourth segment comprising a first curved portion connecting to the first segment, the first curved portion connected to a first straight portion, the first straight portion connected to a second curved portion, the second curved portion connected to the third segment, wherein a first ratio between a radius of the first curved portion and a radius of the second curved portion is between 1.0 and 2.0; and
  a fifth segment connecting the third segment to the second segment, said fifth segment comprising a third curved portion connecting to the third segment, the third curved portion connected to a second straight portion, the second straight portion connected to a fourth curved portion, the fourth curved portion connected to the second segment, wherein a second ratio between a radius of the fourth curved portion and a radius of the third curved portion is between 1.0 and 2.0;
  wherein the method further comprises covering the at least one inductor coil with a coating configured to prevent corrosion and wear of the at least one inductor coil.

15. The method of claim 14, wherein the coating comprises an inner layer consisting of nickel and an outer layer consisting of chromium.

16. The method of claim 14, wherein the third segment is curved.

17. The method of claim 14, wherein the first ratio of the fourth segment is not equal to the second ratio of the fifth segment.

18. An induction sealing device for heat sealing packaging material for producing sealed packages of pourable food products, comprising:
  at least one inductor coil provided with at least one elongated sealing surface configured to contact the packaging material during sealing, said elongated sealing surface comprising a protruding ridge extending along a longitudinal extension of the elongated sealing surface configured to contact the packaging material and increase a sealing pressure on the packaging material during sealing, wherein a profile of said elongated sealing surface in a plane directed orthogonal to the longitudinal extension comprises:
    a first segment abutting a first elongated side surface and a second segment abutting a second elongated side surface;
    a third segment positioned at a level different from the first and second segments and forming a top surface of the protruding ridge;
    a fourth segment connecting the first segment to the third segment, said fourth segment comprising a first curved portion connecting to the first segment, the first curved portion connected to a first straight portion, the first straight portion connected to a second curved portion, the second curved portion connected to the third segment, wherein a first inclination angle between the first segment and the first straight portion is between 100 and 140 degrees; and a fifth segment connecting the third segment to the second segment, said fifth segment comprising a third curved portion connecting to the third segment, the third curved portion connected to a second straight portion, the second straight portion connected to a fourth curved portion, the fourth curved portion connected to the second segment, wherein a second inclination angle between the second segment and the second straight portion is between 100 and 140 degrees;

wherein the at least one inductor coil is covered with a coating, the coating configured to prevent corrosion and wear of the at least one inductor coil.

19. The induction sealing device of claim 18, wherein the coating comprises an inner layer consisting of nickel and an outer layer consisting of chromium.

20. The induction sealing device of claim 18, wherein the third segment is curved.

* * * * *